US012785841B2

(12) United States Patent
Catalano et al.

(10) Patent No.: US 12,785,841 B2
(45) Date of Patent: Nov. 3, 2026

(54) MANAGING POWER IN A WAVELENGTH DIVISION MULTIPLEXING SYSTEM

(71) Applicant: INTERNATIONAL BUSINESS MACHINES CORPORATION, Armonk, NY (US)

(72) Inventors: Pasquale A. Catalano, Wallkill, NY (US); John S. Werner, Fishkill, NY (US); Arkadiy O. Tsfasman, Wappingers Falls, NY (US); Andrew Gerald Crimmins, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 18/665,815

(22) Filed: May 16, 2024

(65) Prior Publication Data

US 2025/0358036 A1 Nov. 20, 2025

(51) Int. Cl.

| | |
|---|---|
| ***H04B 10/00*** | (2013.01) |
| ***H04J 14/02*** | (2006.01) |
| ***H04Q 11/00*** | (2006.01) |
| *H04J 14/00* | (2006.01) |

(52) U.S. Cl.

CPC ...... *H04J 14/0227* (2013.01); *H04Q 11/0062* (2013.01); *H04Q 2011/0073* (2013.01)

(58) Field of Classification Search

CPC ............... H04J 14/0254; H04J 14/0256; H04J 14/0257; H04J 14/0276

See application file for complete search history.

(56) References Cited

U.S. PATENT DOCUMENTS 6,963,533 B2 11/2005 Kukic
7,965,950 B2 6/2011 Childers et al.
8,275,257 B2 9/2012 Forghieri et al.
8,433,193 B2 4/2013 Veselka, Jr. et al.
8,718,097 B2 5/2014 Patel et al.
9,160,477 B2 10/2015 Patel et al.
10,511,388 B1 12/2019 Vassilieva et al.
(Continued)

OTHER PUBLICATIONS

Kadhim et al., High-speed multi-channel long-haul coherent optical transmission system, Telkomnika Telecommunication Computing Electronics and Control, vol. 20, No. 5, DOI: 10. 12928/TELKOMNIKA.v2015.23454, dated Oct. 2022, 10 pages.
(Continued)

*Primary Examiner* — Daniel G Dobson
(74) *Attorney, Agent, or Firm* — Onyx IP Group

(57) ABSTRACT

A controller maps a plurality of client-side traffic ports to a plurality of line-side optical ports of a wavelength division multiplexing system, that are operatively coupled to at least one optical long haul link. The controller determines idle traffic overhead associated with at least one mapped client-side traffic port of the plurality of client-side traffic ports. The controller determines that there is underutilized bandwidth capacity in at least a first line-side optical port in the plurality of mapped line-side ports that would reduce a need for use of at least a second line-side optical port. The controller logically remaps at least one client-side traffic port from the second line-side port to the underutilized first line-side optical port in response to determining that there is underutilized bandwidth capacity of the first line-side optical port.

20 Claims, 5 Drawing Sheets

(56) References Cited

U.S. PATENT DOCUMENTS

| | | | | |
|---|---|---|---|---|
| 11,689,310 | B2 | 6/2023 | Burtsev et al. | |
| 2010/0003032 | A1 | 1/2010 | Houle et al. | |
| 2010/0021166 | A1 | 1/2010 | Way | |
| 2013/0142509 | A1* | 6/2013 | Connolly | H04J 3/1652 398/44 |
| 2016/0050044 | A1* | 2/2016 | Liu | H04J 14/086 398/98 |
| 2021/0021347 | A1* | 1/2021 | Nakada | H04B 10/506 |
| 2023/0006938 | A1 | 1/2023 | Gorshe et al. | |
| 2023/0353499 | A1 | 11/2023 | Liss et al. | |

OTHER PUBLICATIONS

Kumar et al., Performance Analysis for Mixed Line Rates (MLR) WDM/DWDM Networks Under Various Modulation Techniques, IEEE, 2018 International Conference on Wireless Communications, Signal Processing and Networking (WiSPNET), DOI: 10.1109/WISPNET.2018.8538684, dated Mar. 2018, Date Added to IEEE Xplore: Nov. 18, 2018, 6 pages.

Liga et al., Information Rates of Next-Generation Long-Haul Optical Fiber Systems Using Coded Modulation, Journal Of Lightwave Technology, vol. 25, No. 1, dated Jan. 1, 2017, 11 pages.

Tomkos et al., Transparent ultra-long-haul DWDM networks with broadcast-and-select OADM/OXC architecture, Journal of Lightwave Technology, vol. 21, Issue 11, dated Dec. 2003, 13 pages.

Zhou et al., Rate-Adaptable Optics for Next Generation Long-Haul Transport Networks, New Paradigms in Optical Communications and Networks, IEEE Communications Magazine, vol. 51, Issue 3, DOI: 10.1109/MCOM.2013.6476864, dated Mar. 2013, 9 pages.

* cited by examiner

Table I

304

| | Client side port ID and max port speed | Current Inbound traffic BW | Line Side port ID and max port speed | Line side link rerouting data 170 | Line side link control data (Power and/or rate) 172 |
|---|---|---|---|---|---|
| 134a | MuxpndrA:P1:10G | 0G | MuxpndrA:Pout:40G (136) | | |
| 134b | MuxpndrA:P2:10G | 10G | | | |
| 134c | MuxpndrA:P3:10G | 10G | 162 | | |
| 134d | MuxpndrA:P4:10G | 10G | | | |
| 138a | MuxpndrB:P1:10G | 0G | MuxpndrB:Pout1:20G (140a) | | Power Down MuxpnderB:Pout1 |
| 138b | MuxpndrB:P2:10G | 10G | 164 | Reroute client side port ID to MuxpnderA:P1 | |
| 138c | MuxpndrB:P3:10G | 10G | MuxpndrB:Pout2:20G (140b) | | |
| 138d | MuxpndrB:P4:10G | 10G | | | |

FIG. 5

MANAGING POWER IN A WAVELENGTH DIVISION MULTIPLEXING SYSTEM

BACKGROUND

The present disclosure relates to methods, apparatus, and products for managing power in a wavelength division multiplexing system.

Wavelength division multiplexing, WDM, is a technology that increases optical bandwidth by allowing different data streams, such and input/output (I/O) traffic in data centers, to be sent on different light channels or ports, each channel with a unique wavelength, to be sent simultaneously over a single optical fiber. Optical fibers are used for example to connect data center servers across multiple sites, for implementing hybrid cloud computing systems, for providing parallel sysplex systems using distributed servers in different sites, and for other uses. An optical multiplexer, such as a dense WDM (DWDM) multiplexer, on a line-side gathers all of the line-side color links together to be concatenated and transported over a single fiber. At the other end of the fiber the streams are demultiplexed, i.e. separated into different channels again. In systems that use fiber over long distances, transponder cards and muxponders cards connect client equipment to the DWDM platform. The transponder cards and muxponder cards convert inbound client traffic (optical signals) to a line-side ITU-compliant DWDM wavelength. The output of the transponders and muxponders is received by the DWDM multiplexer that combines the multiple different optical wavelength channels on a single fiber. There can be multiple different types of transponders and muxponders that use different protocols that are multiplexed onto the single fiber by the DWDM multiplexer. As one example a transponder includes for each traffic channel, 2 SFP optical transceivers to provide an optical to electrical to optical conversion. The muxponder outputs a plurality of client inputs to a single line-side link, namely a single wavelength channel so that for example four 10 GB (gigabyte/sec) client-side channels are combined into a higher rate 40 GB color line-side link. The line-side ports of a DWDM system typically run at a fixed speed (100 Gb, 400 Gb, etc.), and power can be wasted when there is not enough data being driven into a line-side port (e.g., a color link).

SUMMARY

According to embodiments of the present disclosure, various methods, apparatus and products for managing power in a wavelength division multiplexing system are described herein. In some aspects, various methods, apparatus and products for managing power in a wavelength division multiplexing system provide dynamic remapping of line-side ports to save power when client-side port traffic changes after client-side ports and line-side ports have already been mapped. In some aspects, an apparatus includes a processing device and memory operatively coupled to the processing device, wherein the memory stores computer program instructions that, when executed, cause the processing device to map a plurality of client-side traffic ports to a plurality of line-side optical ports of a wavelength division multiplexing system. The processor determines idle traffic overhead associated with at least one mapped client-side traffic port of the plurality of client-side traffic ports and determines that there is underutilized bandwidth capacity in at least a first line-side optical port in the plurality of mapped line-side optical ports. When there is a change in client-side port traffic and underutilized bandwidth capacity in the first line-side port that can be used to offload client-side traffic from the second line-side port, the processor logically remaps at least one client-side traffic port from the second line-side port to the first line-side optical port in response to determining that there is underutilized bandwidth capacity in the first line-side optical port.

BRIEF DESCRIPTION OF THE DRAWINGS

FIG. 5 illustrates an example of a look up table used to control power in a wavelength division multiplexing system according to aspects of the present disclosure.

DETAILED DESCRIPTION

WDM systems have controllers in controller cards, also referred to as supervisor cards that statically set and fix logical routing of client-side traffic ports to DWDM line-side color link ports for muxponders and transponders in dense wavelength division multiplex systems. Once set, the routing of client-side ports to line-side ports is fixed. However, when there is less traffic than is capable of being output by a line-side port, power going to the line-side laser can be wasted when there is not enough data being driven into a line-side port.

As disclosed herein, a system optimizes power consumption on WDM line-side ports (e.g., that use high powered lasers) when bandwidth is available on other line-side ports, while still meeting level of service requirements or application performance requirements. The client-side inbound ports are dynamically routed logically to line-side ports. In some implementations, the system assigns inbound (colorless) traffic to line-side ports, monitors the inbound port rates, and if there is additional capacity on a higher speed line-side port, the system reallocates inbound traffic to better utilize the higher speed line-side port and disables (or puts in power save mode) a lower rate line-side port that was previously being used. For example, a controller in a wavelength division multiplexing system dynamically remaps one or more client-side traffic ports to one or more line-side optical ports. The controller determines idle traffic overhead associated with at least one mapped client-side traffic port of the plurality of client-side traffic ports and determines that there is underutilized bandwidth capacity in at least a first line-side optical port in the plurality of mapped line-side optical ports. When there is a change in client-side port traffic and underutilized bandwidth capacity in the first line-side port that can be used to offload client-side traffic from the second line-side port, the controller logically remaps at least one client-side traffic port from the second line-side port to the first line-side optical port in response to determining that there is underutilized bandwidth capacity in the first line-side optical port.

Figure 1:
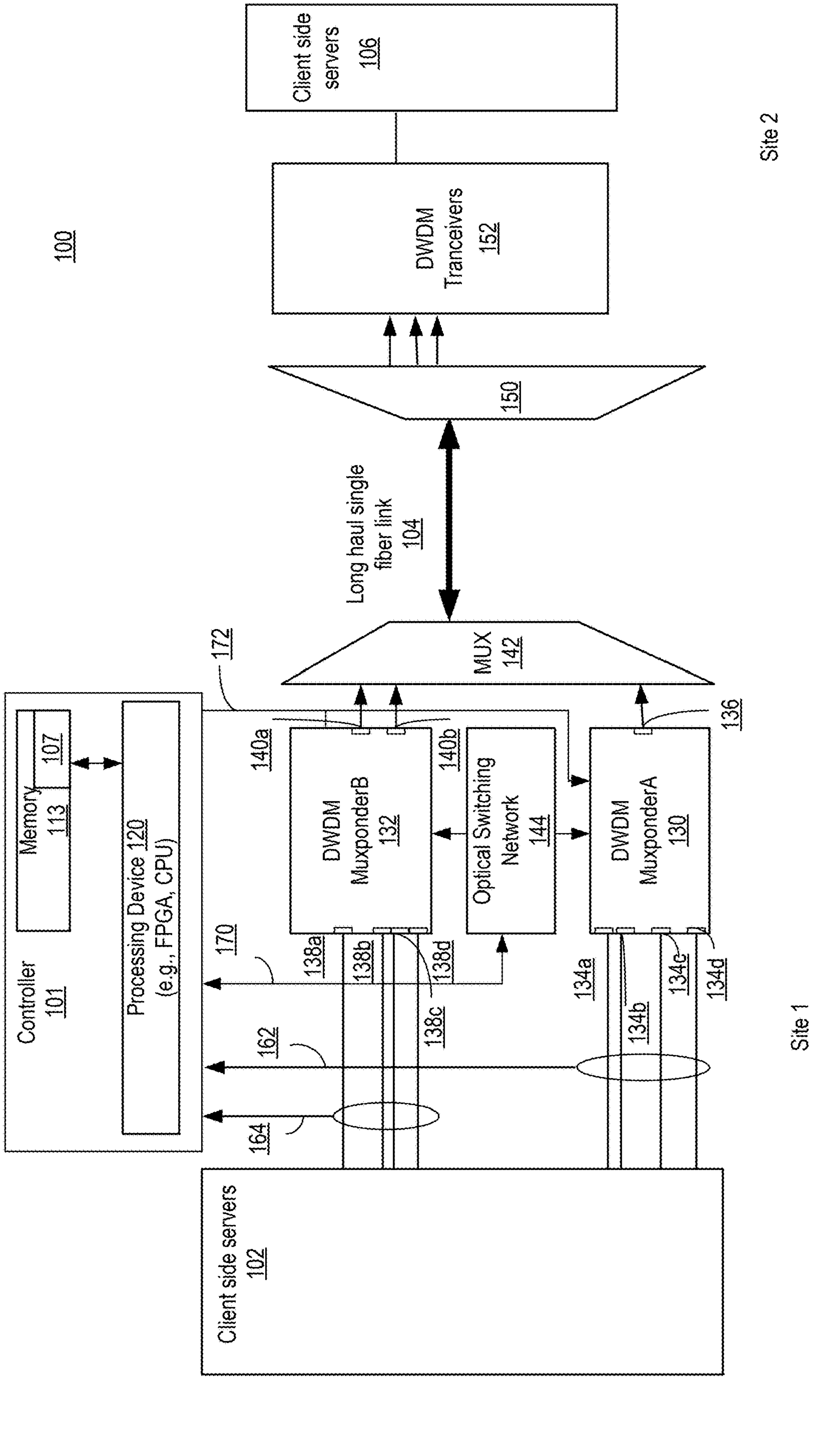
FIG. 1 sets forth an example wavelength division multiplexing system with optical port remapping according to aspects of the present disclosure.

FIG. 1 sets forth an example computing environment according to aspects of the present disclosure. Computing environment 100 contains an example of an environment for the execution of at least some of the computer code involved in performing the various methods described herein, such as dynamic line-side port power control code 107. In addition to block 107, computing environment 100 includes, for example, controller 101, one or more client-side servers 102 that provide traffic that is sent via a fiber long haul link 104 to one or more other client-side servers 106. In this example, client-side servers 102 are in a data center site1 and client-side servers 106 are in a different data center site2 and the fiber long haul link is up to 100 km. In one example the client-side servers include IBM z/OS system servers and IBM system storage configured in a Geographically Dispersed Parallel Sysplex® system available from IBM. However, any suitable environment may be employed.

In this embodiment, controller 101 includes processing device 120 (including processing circuitry and cache), volatile memory, and persistent storage 113, including if desired an operating system and block 107 as identified above. The processing device is coupled to the memory through known interconnects such as one or more buses.

Controller 101 may take the form of one or more processing devices on or coupled to one or more transponder cards, muxponders cards, chassis backplanes of a DWDM system, desktop computer, laptop computer, tablet computer, smart phone, server computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically controller 101, to keep the presentation as simple as possible. Controller 101 may be located in a cloud, even though it is not shown in a cloud in FIG. 1. On the other hand, controller 101 is not required to be in a cloud except to any extent as may be affirmatively indicated.

Controller 101 includes, in one example, a processing device 120 that includes one, or more, computer processors of any type now known or to be developed in the future. For example, the processing device in one implementation is a field programmable gate array (FPGA) device that executes firmware. In other implementations the processing device 120 is a programmed central processing unit (CPU) that executes an operating system that calls block 107 when a power savings mode is selected by a user or other process. Processing circuitry that makes up the processing device may be distributed over multiple packages, for example, multiple, coordinated integrated circuit chips. Processing circuitry may implement multiple processor threads and/or multiple processor cores. The controller 101 in some implementations, includes cache that is memory that is located in the processor chip package(s) and is typically used for data or code that should be available for rapid access by the threads or cores running on processor set. Cache memories are typically organized into multiple levels depending upon relative proximity to the processing circuitry. Alternatively, some, or all, of the cache for the processor set may be located "off chip." In some computing environments, processor set may be designed for working with qubits and performing quantum computing.

Computer readable program instructions are typically loaded onto controller 101 to cause a series of operational steps to be performed by processor set of controller 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache and the other storage media discussed below. The program instructions, and associated data, are accessed by processor set to control and direct performance of the computer-implemented methods. In computing environment 100, at least some of the instructions for performing the computer-implemented methods may be stored in block 107 in persistent storage 113.

The controller in some examples includes volatile memory that is any type of volatile memory now known or to be developed in the future. Examples include dynamic type random access memory (RAM) or static type RAM. Typically, volatile memory is characterized by random access, but this is not required unless affirmatively indicated. In controller 101, the volatile memory is located in a single package and is internal to controller 101, but, alternatively or additionally, the volatile memory may be distributed over multiple packages and/or located externally with respect to controller 101.

Persistent storage 113 is any form of non-volatile storage for computers that is now known or to be developed in the future. The non-volatility of this storage means that the stored data is maintained regardless of whether power is being supplied to controller 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. The code included in block 107 typically includes at least some of the computer code involved in performing the computer-implemented methods described herein.

The controller 101 in some implementations includes a network module to communicate with multiple transponder and/or muxponders cards and is the collection of computer software, hardware, and firmware that allows controller 101 to communicate with other controllers or computers if desired. The network module may include hardware, such as modems or Wi-Fi signal transceivers, software for packetizing and/or de-packetizing data for communication network transmission, and/or web browser software for communicating data over the internet. In some embodiments, network control functions and network forwarding functions of network module are performed on the same physical hardware device. In other embodiments (for example, embodiments that utilize software-defined networking (SDN)), the control functions and the forwarding functions of network module are performed on physically separate devices, such that the control functions manage several different network hardware devices. Computer readable program instructions for performing the computer-implemented methods can typically be downloaded to controller 101 from an external computer or external storage device through a network adapter card or network interface included in network module.

FIG. 1 illustrates a data center site1 that includes client-side servers 102 that send and receive input/output traffic via the long haul fiber 104 using a first muxponder 130 and a second muxponder 132. The muxponders are part of a WDM system and in one example are each implemented as a card with SFP optical transceivers that are plugged into a chassis of a WDM system. Each muxponder includes client-side ports and at least one line-side port shown as 134, 136, 138 and 140. In one example the client-side ports and line-side ports include small form factor pluggable (SFPs) optical transceivers as known in the art that provide optical to electrical to optical conversions. The line-side ports provide optical signals of different wavelengths for an optical multiplexer 142 that combines the different optical output (e.g., colored links) into a multiplexed output for the long haul optical fiber 104 as known in the art. An optical switching network 144, as known in the art, is a cross-port routing switch structure that is programmable to route client-side ports to line-side ports in the WDM system. In one example a portion of the switch 144 is in each of the muxponders. In other examples, a chassis backplane is configured with the switch to logically route any client-side port to any line-side port.

Both sites have similar configurations so that each site can provide power control as described herein. For example, the site2 has a similar structure as site1 (not shown) and as also shown includes a DWDM demultiplexer 150, DWDM transceivers 152, such as corresponding muxponders and/or transponders, that are coupled to provide received traffic from the client-side servers 102 of the first site1 to the client-side servers 106 of the second site. Site1 also has a demultiplexer and provides received data to the line-side ports of the muxponders when receiving data from the site2 similar to the operation provided by site2.

In one example, transponder cards are also included in the WDM system. For example, a 5G link according to a particular protocol is provided into a transponder card and the output of the transponder provides a different wavelength of 5G or other speed link (e.g., colored wavelengths of 1310 nm or 850 nm on the input or client-side, converted to an optical signal within the 1550 nm band on the output or long haul). In some implementations described herein, the controller 101 changes the speed of an optical transceiver path (e.g., transmit and receive SFP pairs) to save power. Typically, transponder cards have 1:1 client-side to line-side channel ratios. Muxponders have 4:1 or 4:2 or other channel ratios and have a higher output rate than the inputs. For example, muxponder 130 is shown to have a 4:1 channel ration and in one example has four 10 Gb input channels at a particular wavelength and combines the data from the four input channels to a color output at a 40 Gb rate at a different wavelength. Muxponder 132 in this example, has a 4:2 ratio such as two 20 Gb inputs **138*a* and 138*b* that are output to a first 40 Gb line-side port 140*a* and another two 20 Gb inputs 138*c* and 138*d* that are output to a second 40 Gb line-side output link 140*b***. Modular WDM systems employ both transponder cards and muxponders cards that often provide data using different protocols. Some muxponders have line-side ports that can be adjusted to provide different output speeds (e.g., tuned from 200 Gb to 800 Gb). Generally, the higher speed of the line-side port, the more power that is needed for the corresponding line-side laser in a transceiver.

As set forth herein, in some implementations, when the input bandwidth from the client-side ports does not maximize the output bandwidth of one or more line ports, the speed of a line port is adjusted to match the total input speed of the client-side ports that are being combined. In some implementations client-side ports (channels) are dynamically re-routed to other line-side ports that have additional capacity, and the unused line-side ports are then powered down after the client-side data has been moved to a different line-side port. In some implementations, both line-side port speed is adjusted (e.g., slowing down line-side link) and client-side rerouting to line-side ports with capacity is performed allowing the powering down of subsequently unused line optical ports (e.g., power to transceivers in a muxponders and/or transponders).

Figure 2:
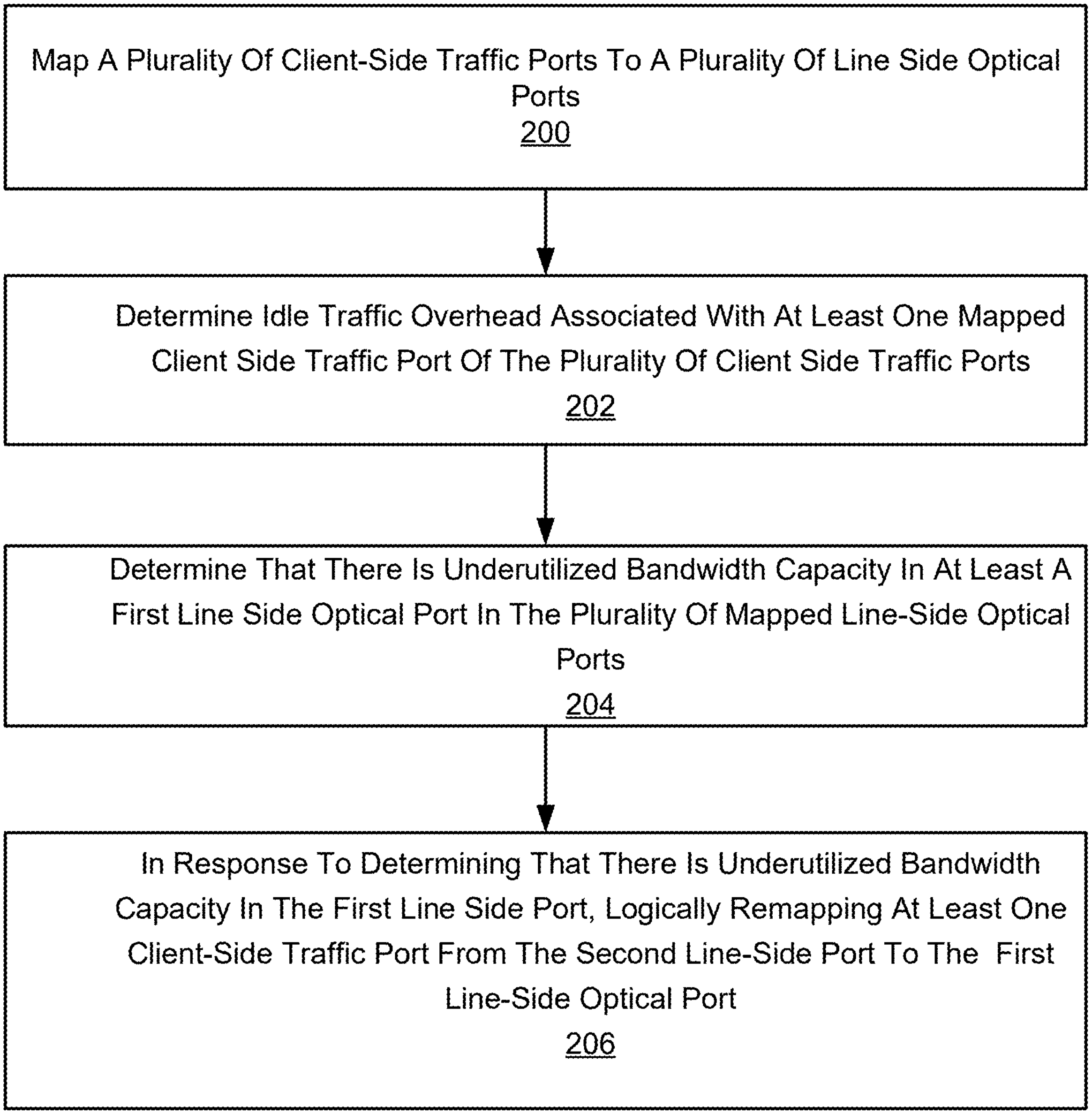
FIG. 2 sets forth a flowchart of an example process for managing power in a wavelength division multiplexing system according to aspects of the present disclosure.

Referring also to FIG. 2, which is a flowchart illustrating a method for managing power in a wavelength division multiplexing system according to aspects of the present disclosure, in this example, the method is carried out by the controller 101, however the method may be carried out by any suitable structure and in any suitable order. In this example, the controller 101 includes the processing device 120 and memory 113 operatively coupled to the processing device, wherein the memory stores computer program instructions 107 that, when executed, cause the processing device to, as shown in block 200, map a plurality of client-side traffic ports to a plurality of line-side optical ports of a wavelength division multiplexing system. For example, the controller initially configures the client-side traffic ports to map or connect with specific line-side ports such as may be done through a user interface when the system is initially set up. For example, the controller configures ports across the entire chassis for all transponders and muxponders as part of an initial setup procedure. By way of example, for muxponder 132, the processing device 120 sends control information shown as initial client-side port to line-side port mapping data 160 to the optical switching network 144 to initially connect the client-side ports to line-side ports. In this example, client-side port **138*a* and 138*b* are initially mapped (connected) to line-side port 140*a* and client-side ports 138*c* and 138*d* are mapped to line-side port 140*b*. For muxponder 130, client-side ports 134*a*-134*d* are mapped to line-side port 136**.

As shown in block 202 the method includes determining idle traffic overhead associated with at least one mapped client-side traffic port of the plurality of client-side traffic ports. For example, a client-side workload may diminish to the point where very little or no data is being communicated to the client-side port. This allows potential power savings by consolidating client-side ports to line-side ports that have excess capacity. The controller dynamically monitors utilization of the mapped client-side traffic ports **134*a*-134*d* and 138*a*-138*d* for current bandwidth levels of each client-side port shown as bandwidth data 162 and 164** respectively.

This may be done in any suitable manner such as by the muxponder providing the current bandwidth data for each client-side port periodically, by the controller requesting the data periodically, by the transponder providing only notifications when a client-side port is idle for a period of time or in any suitable manner. In one example the controller receives a notification from the muxponder when a client-side port is idle. In other implementations the controller monitors one or more activity registers or files of the muxponder that shows whether a client-side port is idle, such as when a port is configured but no data is going to them. In other implementations, the controller produces an idle traffic overhead value for a client-side port or group of client-side ports by subtracting the maximum bandwidth capacity of the client-side link from a current amount of bandwidth being used.

As shown in block 204 the method includes determining that there is underutilized bandwidth capacity in at least a first line-side optical port in the plurality of mapped line-side optical ports. For example, the controller identifies a line-side port that would reduce a need for use of at least another line-side optical port. For example, in one implementation, in response to one or more idle client-side ports being detected that are mapped to a second line-side port, the controller checks to see if there are line-side ports that have capacity to take on the data from other client-side ports that are also connected to the second line-side port, so that the second line-side port can be powered off since it is not needed due to excess capacity in another line-side port.

In one implementation, the controller maintains a look up table of excess capacity values of all line-side ports and compares the excess capacity value to a current bandwidth value of client-side ports that need to be moved. When there is excess capacity in a line-side link that would reduce a need for use of at least another line-side optical port, the associated client-side ports are moved to the line-side port have the excess capacity and the line-side port that is freed up do to the move has its laser powered down to save power.

For example, as shown in block 206 the method includes logically remapping at least one client-side traffic port from the second line-side port to the first line-side optical port in response to determining that there is underutilized bandwidth capacity in the first line-side optical port. For example, the controller generates line-side port remapping data 170 that causes the optical switching network to reroute certain client-side ports to certain line-side ports.

Once remapping has occurred, power control operations are implemented. For example, the controller issues line-side port control data 172 to the appropriate muxponder to adjust power to the line-side optical port previously mapped to the at least one client-side port that was remapped, in response to remapping of the at least one client-side port to the underutilized line-side optical port.

Instead of or in addition to powering down of a line-side laser that no longer has any data being communicated to it from client-side ports, the controller in some implementations sends control information 172 that adjusts a transmission rate of the underutilized line-side optical port, such as by increasing the line-side port speed, in response to remapping of the at least one client-side port to the underutilized first line-side optical port.

In some implementations, the controller 101 is incorporated in a system controller card with switches that form the optical switching network such as switches routed through a backplane in the chassis that routes client-side ports to any line-side ports. In some implementations, the controller in a controller card is programmed such as a microcontroller, such as an FPGA executing firmware in a controller card that monitors client-side port inbound traffic and line-side port output traffic for current bandwidth usage of client-side port and line-side port bandwidth usage. For example, in chassis based configurations, the controller card knows the configurations of the ports and their status. The controller card looks at the inbound links to see if inbound link is being used and monitors output traffic.

Figure 3:
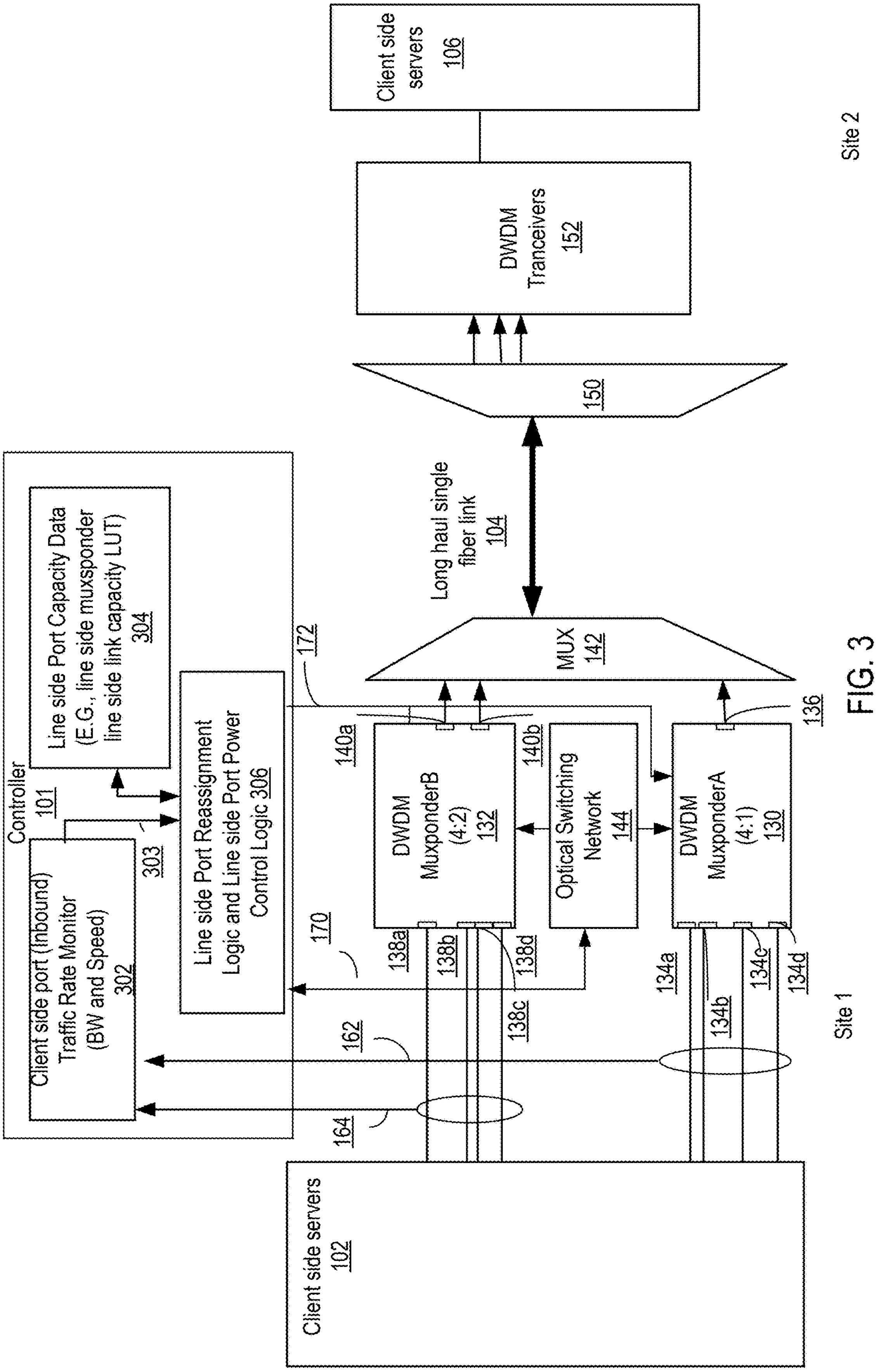
FIG. 3 sets forth an example wavelength division multiplexing system with optical port remapping according to aspects of the present disclosure.

FIG. 3 is a block diagram illustrating an example of functional modules of the controller 101. As shown, the controller 101 includes a client-side port traffic rate monitor 302, line-side port (link) capacity data 304 such as a look up table or other stored data structure and line-side port reassignment logic and line-side port power control logic 306. The client-side port traffic rate monitor 302 provides rate data 303 from each client-side port to the control logic 306 and/or data indicating that a client-side port is idle. The control logic 306 has access to line-side port capacity data 304 that is stored in one or more look up tables or other suitable data structure. In one example, the data 304 includes a copy of the current routing map so the control logic 306 knows what client-side ports are connected to which line-side ports and the maximum capacity of each line-side port and each client-side port.

Figure 4:
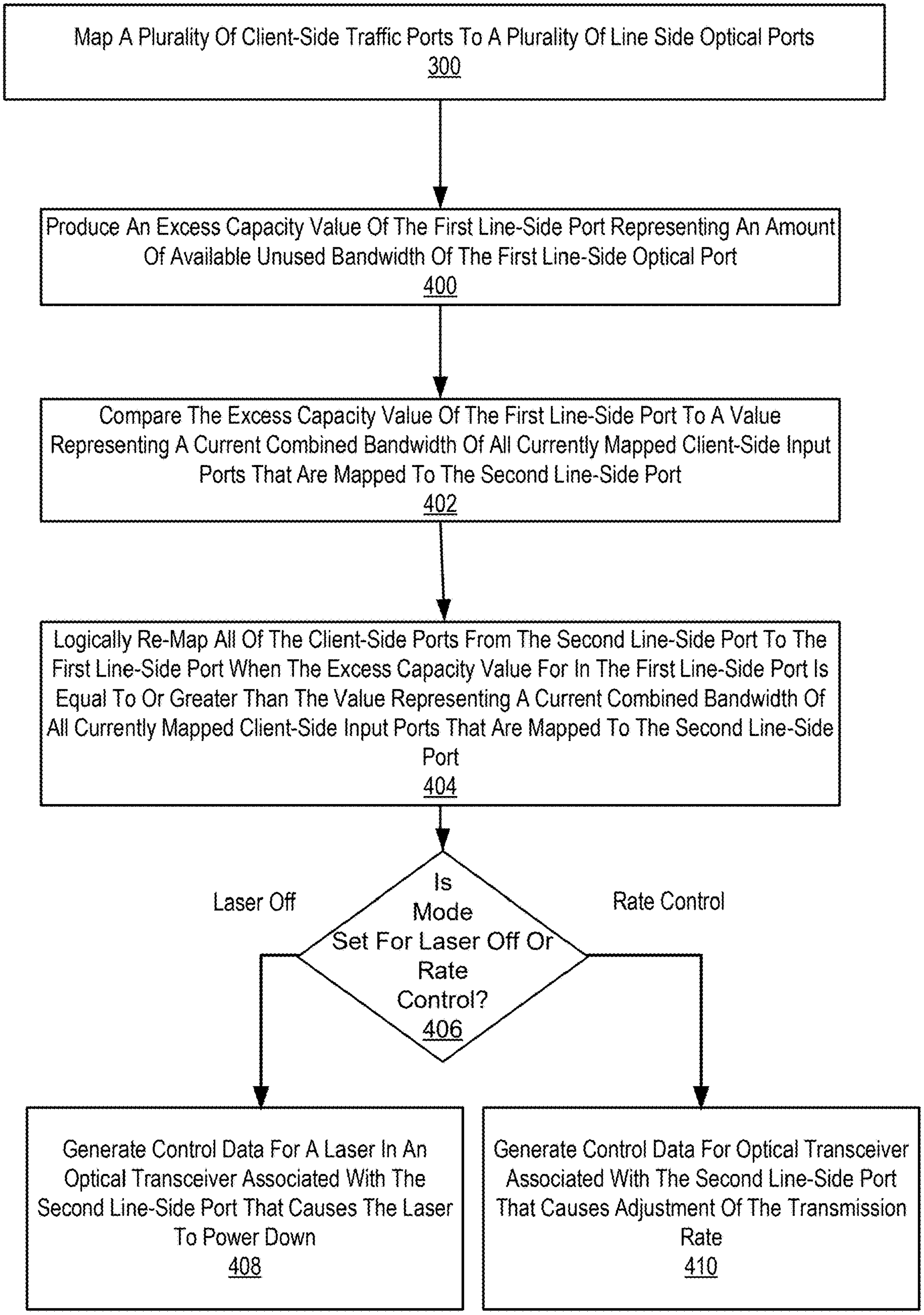
FIG. 4 sets forth a flowchart of an example process for managing power in a wavelength division multiplexing system according to aspects of the present disclosure.

Referring also to the flow chart of FIG. 4 and the look up table of FIG. 5, an example operation of the controller 101 will be described. As shown in block 300 the method includes mapping the client-side traffic ports to line-side optical ports. This is stored in a look up table 304 available to the control logic 306. For example, Table I in FIG. 5 illustrates an example of data 304 in the form of a portion of a line-side power management look up table. As shown in block 400 the method includes producing an excess capacity value of a line-side port representing an amount of available unused bandwidth of the first line-side optical port. For example, the line-side port reassignment logic 306 knows what traffic is coming in from the client-side ports from the bandwidth data 162 and 164 and the capacity of each outbound line-side ports. By comparing a maximum bandwidth capacity value of a line-side port to all client ports currently assigned to the line-side port, the control logic 306 calculates the excess capacity value which indicates an amount of underutilized bandwidth. In this example, line-side port 136 has an excess capacity value of 10G since it has a 40G max capacity and only 30G of current inbound traffic is being used by client-side ports 134*b*-134*d*. The LUT in one example includes data representing: a maximum line-side port bandwidth capacity (e.g., port speed), current port bandwidth utilization for each of the plurality of line-side ports (e.g., that is measured or is calculated from the current utilization of client-side ports that are routed to a line-side port), a maximum and current bandwidth utilization of the plurality of client-side ports, and a current routing map.

As shown in block 402, the method includes comparing the excess capacity value of the first line-side port (e.g., 10G) to a value representing a current combined bandwidth of all currently mapped client-side input ports that are mapped to a different line-side port. In this example there are two different line-side ports 140*a* and 140*b*. The control logic sums the combined bandwidth of all currently mapped client-side ports to line-side port 140*a* as 10G and the combined bandwidth of all currently mapped client-side ports to line-side port 140*b* as 20G. The control logic compares the excess capacity value of 10G to each of the values 10G and 20G and chooses the line-side port 140*a* to shut down and move the 10G client-side port 138*b* to move since it matches the capacity available on line-side port 136. As such, in one example, the controller compares the excess capacity value with a current (or predicted future) amount of input traffic bandwidth associated with one or more client-side ports that are currently mapped to other line-side ports to see if a line-side port that is underutilized can have its traffic moved to a different line-side port that has excess capacity and then have the laser power reduce. The excess capacity values and sums may also be placed in the LUT along with any other suitable data as desired.

As shown in block 404, the method includes logically re-mapping all of the client-side ports from the second line-side port to the first line-side port when the excess capacity value for in the first line-side port is equal to or greater than the value representing a current combined bandwidth of all currently mapped client-side input ports that are mapped to the second line-side port. In this example, the control logic issues remapping data 170 to the optical switching network to remap client-side port 138*b* to line-side port 136. In some implementations, determining idle traffic overhead associated with at least one mapped client-side traffic port includes determining that the at least one client-side traffic port is idle, such as client-side port 134*a* being OG and logically remapping includes generating line-side port remapping data 170 for the optical switching network 144 in the WDM system that causes the optical switching network to reroute data traffic from the client-side traffic port 138*b* from the second line-side port 140*a* to the underutilized first line-side optical port 136.

As shown in block 406, in some implementations, a control register or other setting is used to set a control mode so that unused line-side lasers are turned off or line-side laser rates are adjusted to save power. In one example, as shown in block 408, the method includes the control logic 306 generating control data 172 for a laser in an optical transceiver associated with the second line-side port 140*a* that causes the laser to shut off. As shown in block 410 if rate control is set, the control logic 306 generates control data 172. For example, when rate-adjustment on the line-side of the card for which the signals are being moved off of is done, it occurs after remapping to the other line-side which has excess capacity to absorb it. When rate adjustment is provided on the line-side laser that the signals are being moved to, then in some cases the laser rate is increased before remapping to it is performed. By way of illustration, if a 5G signal on one card is being moved onto a line-side port elsewhere that is also currently running at 5G, but is capable of running at 10G, then the laser is adjusted to run at 10G before re-routing occurs so the port can absorb the second 5G signal.

In some implementations, the controller designates at least one mapping of a client-side port to a line-side optical port as not remappable and avoids remapping of the designated client-side port in response to the designation. The designation can be data in the look up table 304. For example, where certain link/protocol types such as IBM coupling links, system time protocol links or other criteria require dedicated fixed latency transponders, the controller marks those as mappings as immovable so that even if there is excess capacity in a line-side link, the client-side and line-side connection is not moved.

As noted above, the controller monitors outbound ports from each line-side transponder. The controller knows what traffic is coming in and capacity of outbound line-side ports. The controller consolidates incoming data to fewer line-side color links. The controller attempts to "stuff" the line-side ports. For example, if only 1 of 4 10 Gb inputs to transponder 130 that has 1 40 g output is being used, the controller remaps (logically moves) the inbound traffic on the 1 10 Gb input to another transponder 132 that has a 10 Gb input that is not being used and shuts off the laser in the transponder 130 to reduce line-side port power on transponder now that no traffic is being output. The controller compares what traffic is coming in and compares the traffic to a current mapping of client-side ports to line-side port mappings knowing the current capacity of the line-side ports. If traffic changes on inbound ports where more capacity is needed or less capacity is needed because input traffic changed, the controller reroutes client-side ports to line-side ports to accommodate the changes.

In some implementations, transponder cards include controller cards that map client-side inputs to line-side output ports for initial mapping. However, this operation is static and does not change during operation of the system. Unlike conventional WDM systems, as described herein, a the controller card includes additional software code that when executed, causes dynamic mapping is by the controller card that changes the initial mapping to a remapped client-side input port to a different line-side output port such as through logical remapping of client-side input ports through a back plane connection to blind side link ports within the same muxponder card or across muxponder cards and transponders in a chassis and across chassis if desired where the backplane connection provides for such logical mapping.

In some implementations, the controller sends control information to the other side of the long haul link that causes the changes on one end to be reflected on the other end as well so that the traffic is routed back to the original intended endpoint. The DWDM systems should be configured to logically look like a mirror image at the endpoints.

In some implementations, the controller sends control information 170, such as data representing client-side port identifiers and corresponding line-side port identifiers, to multiple muxponder card controllers that causes each muxponders card to reroute their respective ports as needed. For example, the controller sends remapping control information to each of the muxponders cards in the chassis to route different inbound ports to different line-side ports. In other implementations, the controller logically re-routes client-side ports that are in a first plane to line-side ports that are configured in a second plane of the chassis and the controller sends remapping control information to the switch that initially configured the paths to re-route client-side ports to different line-side ports after an initial configuration has occurred due to changes in workload coming in on the client-side ports.

As disclosed herein, in some implementations, the system optimizes power consumption on WDM line-side ports (high powered lasers) when bandwidth is available on other line-side links, while still meeting level of service requirements or application performance requirements. In some implementations, the system assigns inbound (colorless) traffic to line-side ports, monitors the inbound port rates, and if there is additional capacity on a higher speed line-side port, the system reallocates inbound traffic to better utilize the higher speed line-side port and disables (or puts in power save mode) a lower rate line-side port that was previously being used. In certain implementations, the system allocates client-side ports to long side ports (these lasers are very power-hungry up to 10 W each) and monitors utilization of client-side bandwidth/speed to determine idle traffic overhead in the system. When there is overhead capacity on the client-side ports, the system determines if there is capacity in a long-side port that would reduce the need for other line-side ports that are currently in use. In some cases, if certain link/protocol types (e.g. IBM coupling links, system time protocol links, etc.) require dedicated fixed latency transponders, client-side link and corresponding line-side port are marked as immovable. The system reassigns an allocation of the client-side port to a different long-side port that is underutilized and turns of those long side links that are no longer needed. In some examples, instead of turning off power, line-side port speeds are dynamically adjusted (e.g., lowered to save power). For example, when client-side ports are not providing as much data, one or more line-side port speeds are adjusted to better match the bandwidth of all the client ports. In some examples, shared allocation can be rate limited to the trunk side uplinks, or smaller/larger Optical Transport Unit (OTU) containers for Generic Frame Mapping Protocol (GFMP).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method carried out in a wavelength division multiplexing (WDM) system comprising:

mapping a plurality of client-side traffic ports to a plurality of line-side optical ports of a wavelength division multiplexing system, that are operatively coupled to at least one optical long haul link;

determining idle traffic overhead associated with at least one mapped client-side traffic port of the plurality of client-side traffic ports;

determining that there is underutilized bandwidth capacity in at least a first line-side optical port in the plurality of mapped line-side optical ports that would reduce a need for use of at least a second line-side optical port; and logically remapping at least one client-side traffic port from the second line-side port to the underutilized first line-side optical port in response to determining that there is underutilized bandwidth capacity of the first line-side optical port.

2. The method of claim 1 further comprising adjusting power to the second line-side optical port previously mapped to the at least one client-side port that was remapped, in response to remapping of the at least one client-side port to the underutilized first line-side optical port.

3. The method of claim 1 further comprising adjusting a transmission rate of the underutilized first line-side optical port in response to remapping of the at least one client-side port to the underutilized first line-side optical port.

4. The method of claim 1 comprises:

producing an excess capacity value of the first line-side port representing an amount of available unused bandwidth of the first line-side optical port;

comparing the excess capacity value of the first line-side port to a value representing a current combined bandwidth of all currently mapped client-side input ports that are mapped to the second line-side port; and logically re-mapping all of the client-side ports from the second line-side port to the first line-side port when the excess capacity value for in the first line-side port is equal to or greater than the value representing a current combined bandwidth of all currently mapped client-side input ports that are mapped to the second line-side port.

5. The method of claim 1 wherein determining idle traffic overhead associated with at least one mapped client-side traffic port comprises determining that the at least one client-side traffic port is idle; and wherein logically remapping comprises:

generating line-side port remapping data for an optical switching network in the WDM system that causes the optical switching network to reroute data traffic from at least one client-side traffic port from the second line-side port to the underutilized first line-side optical port; and generating control data for a laser in an optical transceiver associated with the second line-side port that causes the laser to shut off.

6. The method of claim 1 comprising designating at least one mapping of a client-side port to a line-side optical port as not remappable and avoiding remapping of the designated client-side port in response to the designation.

7. The method of claim 1 comprising generating a look up table comprising at least data representing: a maximum port bandwidth capacity, current port bandwidth utilization for each of the plurality of line-side ports, a maximum and current bandwidth utilization of the plurality of client-side ports and a current routing map.

8. An apparatus comprising:

a processing device; and memory operatively coupled to the processing device, wherein the memory stores computer program instructions that, when executed, cause the processing device to:

map a plurality of client-side traffic ports to a plurality of line-side optical ports of a wavelength division multiplexing system;

determine idle traffic overhead associated with at least one mapped client-side traffic port of the plurality of client-side traffic ports;

determine that there is underutilized bandwidth capacity in at least a first line-side optical port in the plurality of mapped line-side optical ports that would reduce a need for use of at least a second line-side optical port; and logically remap at least one client-side traffic port from the second line-side port to the first line-side optical port in response to determining that there is underutilized bandwidth capacity in the first line-side optical port.

9. The apparatus of claim 8 wherein the memory stores computer program instructions that, when executed, cause the processing device to adjust power to the second line-side optical port previously mapped, to the at least one client-side port that was remapped in response to remapping of the at least one client-side port to the underutilized first line-side optical port.

10. The apparatus of claim 8 wherein the memory stores computer program instructions that, when executed, cause the processing device to adjust a transmission rate of the underutilized first line-side optical port in response to remapping of the at least one client-side port to the underutilized first line-side optical port.

11. The apparatus of claim 8 wherein the memory stores computer program instructions that, when executed, cause the processing device to:

produce an excess capacity value of the first line-side port representing an amount of available unused bandwidth of the first line-side optical port;

compare the excess capacity value of the first line-side port to a value representing a current combined bandwidth of all currently mapped client-side input ports that are mapped to the second line-side port; and logically re-map all of the client-side ports from the second line-side port to the first line-side port when the excess capacity value for in the first line-side port is equal to or greater than the value representing a current combined bandwidth of all currently mapped client-side input ports that are mapped to the second line-side port.

12. The apparatus of claim 8 wherein the memory stores computer program instructions that, when executed, cause the processing device to:

determine that the at least one client-side traffic port is idle;

generate line-side port remapping data for an optical switching network in the wavelength division multiplexing system that causes the optical switching network to reroute data traffic from at least one client-side traffic port from the second line-side port to the underutilized first line-side optical port; and generate control data for a laser in an optical transceiver associated with the second line-side port that causes the laser to shut off.

13. The apparatus of claim 8 wherein the memory stores computer program instructions that, when executed, cause the processing device to designate at least one mapping of a client-side port to a line-side optical port as not remappable and avoiding remapping of the designated client-side port in response to the designation.

14. The apparatus of claim 8 wherein the memory stores computer program instructions that, when executed, cause the processing device to generate a look up table comprising at least data representing: a maximum port bandwidth capacity, current port bandwidth utilization for each of the plurality of line-side ports, a maximum and current bandwidth utilization of the plurality of client-side ports and a current routing map.

15. A wavelength division multiplexing system comprising:

at least a first muxponder with a first plurality of client-side ports and at least a first line-side port operative to output optical traffic on a first wavelength;

at least a second muxponder with a second plurality of client-side ports and at least a second line-side port operative to output traffic on a second wavelength;

an optical switching network configurable to route the first and second plurality of client-side ports to each of the first and second line-side ports;

an optical multiplexer, operative to combine optical output from the first and second line-side ports to an optical fiber; and a controller, operatively coupled to the switching network and to the first and second line-side ports, the controller configured to:

map a plurality of client-side traffic ports to a plurality of line-side optical ports of a wavelength division multiplexing system;

determine idle traffic overhead associated with at least one mapped client-side traffic port of the plurality of client-side traffic ports;

determine that there is underutilized bandwidth capacity in at least a first line-side optical port in the plurality of mapped line-side optical ports;

logically remap at least one client-side traffic port from the second line-side port to the first line-side optical port in response to determining that there is underutilized bandwidth capacity in the first line-side optical port; and adjust power to the second line-side optical port previously mapped to the at least one client-side port that was remapped, in response to remapping of the at least one client-side port to the underutilized first line-side optical port.

16. The system of claim 15 wherein the controller is operative to adjust a transmission rate of the underutilized first line-side optical port in response to remapping of the at least one client-side port to the underutilized first line-side optical port.

17. The system of claim 15 wherein the controller is operative to:

produce an excess capacity value of the first line-side port representing an amount of available unused bandwidth of the first line-side optical port;

compare the excess capacity value of the first line-side port to a value representing a current combined bandwidth of all currently mapped client-side input ports that are mapped to the second line-side port; and logically re-map all of the client-side ports from the second line-side port to the first line-side port when the excess capacity value for in the first line-side port is equal to or greater than the value representing a current combined bandwidth of all currently mapped client-side input ports that are mapped to the second line-side port.

18. The system of claim 15 wherein the controller is operative to:

determine that the at least one client-side traffic port is idle;

generate line-side port remapping data for the optical switching network that causes the optical switching network to reroute data traffic from at least one client-side traffic port from the second line-side port to the underutilized first line-side optical port; and generate control data for a laser in an optical transceiver associated with the second line-side port that causes the laser to shut off.

19. The system of claim 15 wherein the controller is operative to designate at least one mapping of a client-side port to a line-side optical port as not remappable and avoiding remapping of the designated client-side port in response to the designation.

20. The system of claim 15 wherein the controller is operative to generate a look up table comprising at least data representing: a maximum port bandwidth capacity, current port bandwidth utilization for each of the plurality of line-side ports, a maximum and current bandwidth utilization of the plurality of client-side ports and a current routing map.

* * * * *